(12) United States Patent
Horvath et al.

(10) Patent No.: US 12,291,145 B2
(45) Date of Patent: May 6, 2025

(54) SECURITY SYSTEM FOR AN AUTONOMOUS VEHICLE AND METHOD FOR ITS OPERATION

(71) Applicant: KNORR-BREMSE Systeme fuer Nutzfahrzeuge GmbH, Munich (DE)

(72) Inventors: Csaba Horvath, Budapest (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 190 days.

(21) Appl. No.: 18/016,138

(22) PCT Filed: Jul. 2, 2021

(86) PCT No.: PCT/EP2021/068308
§ 371 (c)(1),
(2) Date: Jan. 13, 2023

(87) PCT Pub. No.: WO2022/012967
PCT Pub. Date: Jan. 20, 2022

(65) Prior Publication Data
US 2023/0256901 A1    Aug. 17, 2023

(30) Foreign Application Priority Data

Jul. 17, 2020   (EP) .................................... 20186469

(51) Int. Cl.
*B60Q 1/52*    (2006.01)
*B60Q 5/00*    (2006.01)
(Continued)

(52) U.S. Cl.
CPC ............... *B60Q 1/52* (2013.01); *B60Q 5/005* (2013.01); *B60W 60/001* (2020.02);
(Continued)

(58) Field of Classification Search
CPC ....... B60Q 1/52; B60Q 5/005; B60W 60/001; B60W 2554/408; B60W 2554/404;
(Continued)

(56) References Cited

U.S. PATENT DOCUMENTS 9,008,890 B1    4/2015   Herbach et al.
9,598,078 B2 *  3/2017   Moran ................ B60W 30/085
(Continued)

FOREIGN PATENT DOCUMENTS

WO    WO 2018/033518 A1    2/2018
WO    WO 2019/076444 A1    4/2019

OTHER PUBLICATIONS

International Search Report (PCT/ISA/210) issued in PCT Application No. PCT/EP2021/068308 dated Aug. 9, 2021 (three (3) pages).

(Continued)

*Primary Examiner* — Curtis J King
(74) *Attorney, Agent, or Firm* — Crowell & Moring LLP

(57) ABSTRACT

A security system is provided for an autonomous vehicle driving on a road. The autonomous vehicle has a sensor unit for collecting sensor information, and a planning unit for generating planning data for the autonomous vehicle. The security system is characterized by a reception module, configured to receive the sensor information and the planning data; a detection module, configured to detect, based on the sensor information, a driving situation of the autonomous vehicle in which one or more objects on the road cause the autonomous vehicle to slow down; an assessment module, configured to assess the driving situation based on the detection of the driving situation, the sensor information, and the planning data, as a potential plunder incident; and a (Continued)

reaction module, configured to execute, in case of the potential plunder incident, an emergency reaction of the autonomous vehicle.

20 Claims, 3 Drawing Sheets

(51) Int. Cl.
| | |
|---|---|
| *B60W 60/00* | (2020.01) |
| *G06V 20/56* | (2022.01) |
| *G06V 20/58* | (2022.01) |
| *G07C 5/00* | (2006.01) |
| *H04W 4/44* | (2018.01) |
| *H04W 4/46* | (2018.01) |

(52) U.S. Cl.
CPC ............ *G06V 20/58* (2022.01); *G06V 20/588* (2022.01); *G07C 5/008* (2013.01); *H04W 4/44* (2018.02); *H04W 4/46* (2018.02); *B60W 2554/408* (2020.02)

(58) Field of Classification Search
CPC .. B60W 2556/45; B60W 40/04; G06V 20/58; G06V 20/588; G07C 5/008; H04W 4/44; H04W 4/46
See application file for complete search history.

(56) References Cited

U.S. PATENT DOCUMENTS

| | | | |
|---|---|---|---|
| 9,870,001 B1* | 1/2018 | Mangal | B60W 40/09 |
| 11,716,604 B2* | 8/2023 | Nagasawa | H04W 4/44 |
| | | | 455/404.1 |
| 2013/0063282 A1* | 3/2013 | Baldwin | B61L 29/282 |
| | | | 340/941 |
| 2014/0214832 A1* | 7/2014 | Nandakumar | G06Q 50/01 |
| | | | 707/737 |
| 2015/0025714 A1* | 1/2015 | Beer | G05B 19/4189 |
| | | | 701/19 |
| 2016/0284222 A1* | 9/2016 | Nicholls | G08G 5/025 |
| 2017/0248949 A1* | 8/2017 | Moran | G08G 1/165 |
| 2018/0307834 A1 | 10/2018 | Xue | |
| 2019/0047580 A1* | 2/2019 | Kwasnick | G05D 1/0088 |
| 2019/0137287 A1* | 5/2019 | Pazhayampallil | G05D 1/0291 |
| 2019/0337525 A1 | 11/2019 | Sippl et al. | |
| 2020/0094852 A1 | 3/2020 | Kahn | |
| 2020/0406925 A1* | 12/2020 | Du | G06F 16/29 |
| 2022/0038881 A1* | 2/2022 | Nagasawa | G08G 1/164 |
| 2023/0234576 A1* | 7/2023 | Jung | G06F 11/3688 |
| 2024/0140406 A1* | 5/2024 | Widera | B60Q 1/46 |

OTHER PUBLICATIONS

Written Opinion (PCT/ISA/237) issued in PCT Application No. PCT/EP2021/068308 dated Aug. 9, 2021 (six (6) pages).
Extended European Search Report issued in European Application No. 20186469.1 dated Feb. 3, 2021 (eight (8) pages).

* cited by examiner

SECURITY SYSTEM FOR AN AUTONOMOUS VEHICLE AND METHOD FOR ITS OPERATION

BACKGROUND AND SUMMARY

The present invention relates to a security system for an autonomous vehicle, a method for an autonomous vehicle, and in particular to a deliberate blockage and plunder prevention of autonomous vehicles.

Autonomous vehicles represent potential targets for plundering. This applies in particular to commercial autonomous vehicles, which can be attractive for the sake of transported goods. While in a not completely autonomous vehicle, a driver will still be present to monitor the vehicle, and to call for emergency if required. A fully autonomous vehicle is completely driver-free, and therefore more prone to being defenseless against plundering or hijacking.

US2018307834A1 describes a method for detecting a hijacking of an autonomous vehicle by a hacker, and proposes an emergency handling operation to overcome this situation. In contrast to an electronic take-over, an autonomous vehicle may also be the target of a physical hijacking. A possible scenario for such a plunder incident involves a commercial autonomous vehicle navigating on a road with limited escape options, with two or three other vehicles by forcing it to slow down by taking advantage of the collision avoidance system of the commercial vehicle, and possibly keeping it in standstill position such that goods may be stolen off the commercial vehicle.

Therefore there is a demand for a system which is able to recognize, signal, and possibly prevent, a potential plunder incident involving a physical blockage of an autonomous vehicle.

At least some of these problems are overcome by a system, an autonomous vehicle, a method, and a computer product, according to the independent claims. The dependent claims refer to further advantageous realizations of the subject matter of the independent claims.

The present invention relates to a security system for an autonomous vehicle driving on a road. The autonomous vehicle in particular comprises a sensor unit for collecting sensor information, and a planning unit for generating planning data. The security system is characterized by a reception module, configured to receive the sensor information and the planning data; a detection module, configured to detect, based on the sensor information, a driving situation of the autonomous vehicle in which one or more objects on the road force the vehicle to slow down; an assessment module, configured to assess the driving situation based on the detection of the driving situation, the sensor information, and the planning data as a potential plunder incident; and a reaction module, configured to execute, in case of the potential plunder incident, an emergency reaction of the autonomous vehicle.

The autonomous vehicle may in particular be fully autonomous, such that no driver is required. The proposed system may however also be of benefit in a merely conditionally or highly automated vehicle, as e.g. in a long-haul commercial vehicle where a driver is still present, but components of the autonomous vehicle monitor the driving environment and perform most of the driving tasks automatically, either still admitting human override or requiring action only in special situations.

On general grounds, the autonomous vehicle will comprise sensors for an acquisition of data from within and around the vehicle. Along with this, it will include means for executing environment perception and surveillance functions. The autonomous vehicle will further comprise means for planning and for executing its motions, typically in several layers. Such layers may include e.g. a higher layer for navigation, deciding which roads the vehicle will take in order to arrive at a destination and which obstacles—such as traffic congestions, road construction sites or weather conditions—may be anticipated to have an influence on the vehicle along its route. There can be successive lower layers, e.g. a layer for maneuvers which initializes executions of standard tasks like lane changing or overtaking, and a layer for trajectories which manages the precise execution of maneuvers and anticipates the movements of the vehicle within the next couple of seconds. The autonomous vehicle furthermore generically comprises means for communication with other vehicles or road users and/or with en route or remote partners.

The term sensor unit collectively refers to the sensors on board the vehicle, including e.g. exteroceptive and interoceptive sensors, as well as devices for navigation and positioning. The planning data provided by the planning unit may comprise data from all the above-mentioned levels.

The reception module is adapted to tap into sensor data retrieved by the sensor unit, and/or is granted access to an online and/or offline data stream of the autonomous vehicle. It is also connected with the planning unit, and may be connected with further components of the autonomous vehicle, such as an execution or motion control unit.

Advantageously, the detection module is configured to detect a driving situation where a reduction of speed of the autonomous vehicle is unexpected, which may be signaled by the fact that the reduction of speed does not occur due to a reason anticipated by the planning unit in some higher layer, but rather as a reaction to a detection of the one or more objects on the road on a shorter notice.

The assessment module may, in assessing the driving situation, be configured to identify further reasons for blocking the road. This may in particular be based on a classification of the one or more objects which cause the deceleration of the autonomous vehicle. A strategy or a protocol for an assessment may be adapted to a class of the object. The assessment module may further be configured to assess the situation by an inquiry through a means for communication installed on the vehicle, and to retrieve information from remote sources and/or other vehicles.

The emergency reaction may include warning or reporting messages to humans on board or remote from the vehicle. It may further include turning on emergency flashers or a horn of the vehicle. It may also include a performance of special maneuvers, e.g. with the intention to evade, overtake, or otherwise avoid the one or more objects.

The modules of the presented system, i.e. the reception module, the detection module, the assessment module, and the reaction module, may be embodied as one device, or partially or fully integrated into other components of the autonomous vehicle or into each other. In particular, some or all of these modules may be integrated in the planning unit, in an environment perception and/or surveillance unit, or in a motion control unit of the autonomous vehicle. Furthermore, functions described above as part of a task of one particular module may in embodiments be incorporated within another one.

Optionally, the detection module, the assessment module and/or the reaction module are configured to extract, from the sensor information, information about road vehicles and pedestrians around the autonomous vehicle, and about one or more of the following: a drivable surface, road markings, objects on the road, and/or objects away from the road. This information may be utilized to provide a rating, prediction or judgement of behavior of other road users in order to assess the driving situation as a potential plunder incident. The information may also be included in a determination of feasible reactions.

Optionally, the planning unit is configured to generate a traffic behavior prediction for vehicles and pedestrians around the autonomous vehicle, and the assessment module is configured to receive the traffic behavior prediction, to perform, on basis of comparison between the traffic behavior prediction and the information about other vehicles and/or pedestrians, an evaluation (respectively, determine a measure or index for a reasonability) of an actual behavior of the other vehicles and/or pedestrians, and to use the evaluation for assessing the driving situation.

Generically, automatic driving tasks require the planning module to generate predictions about the behavior of other traffic participants (i.e. other vehicles and/or pedestrians) at least on a low layer, or for short periods of time. Such traffic behavior predictions may e.g. be based on observation and extrapolation of the other traffic participants, on their relative velocities, or on signals or messages emitted from them to the autonomous vehicle. A traffic behavior prediction advantageously also involves an assessment of a current traffic situation, as e.g. heavy traffic or traffic congestion, and the planning module may suppress or initiate particular maneuvers, as e.g overtaking, pulling to a side lane, quickly establishing a distance from a dangerous zone, or other defensive or proactive measures based on the traffic situation. Advantageously, the reception module may be configured to retrieve this information from dedicated components of the autonomous driving system. The generation of the traffic behavior prediction may also be initiated by the assessment module, e.g. with parameters focusing on particular road users around the vehicle.

Optionally, the assessment module is configured to assess a potential plunder incident based on the driving situation to correspond, for at least a specified duration, to the following: one or more vehicles positioned next to the autonomous vehicle slow down and do not admit a direction for the autonomous vehicle to overtake the one or more vehicles, and there is no object on the road and no object away from the road which requires the one or more vehicles to slow down.

The aspect that there is no object on the road or away from the road, or else that there is "no reason" for the one or more vehicles to slow down, may in particular be based on a behavior prediction for the one or more vehicles. This may include having the planning unit or the assessment module carrying out a behavior planning for the one or more vehicles, based on the sensor data of the autonomous vehicle. Objects on the road may in particular be further vehicles slowing down in front of the one or more vehicles, as e.g at a beginning of a traffic congestion, a tunnel, a sharp turn, an acclivity, an onset of a particular weather condition such as gusts of wind, rain, snow or hail, or a traffic light or a construction zone ahead. Objects on the road may also be particularly slow vehicles or pedestrians further ahead. Objects away from the road may include traffic lights or traffic signals, construction zones, or moving bodies potentially threating road users. The condition that the situation should hold for at least a particular time, potentially depending on the traffic situation and/or on the speed of the autonomous vehicle, is advantageously designed to prevent the assessment module from overinterpreting the situation.

Optionally, if the autonomous vehicle comprises a Collision Avoidance System, the reception module is configured to receive information from the Collision Avoidance System, and the assessment module is configured to assess a potential plunder incident based on the driving situation to correspond, for at least a specified duration, to the following: one or more vehicles positioned next to the autonomous vehicle do not admit a direction for the autonomous vehicle to overtake the one or more vehicles, and the Collision Avoidance System directs the car off the road in order to avoid collision with the one or more vehicles.

Such an action, aimed at thwarting or outbraking the autonomous vehicle, may be particularly convenient for a hijacking, as the autonomous vehicle will for safety reasons generically be programmed to drive in a rather defensive, friendly or discreet way.

Optionally, in situations as those just described, the autonomous vehicle is configured to receive, from the one or more vehicles and/or from a remote station, a message establishing an authorization, and the assessment module is configured to suppress the assessment of a potential plunder incident if the autonomous vehicle receives the message establishing the authorization from the one or more vehicles and/or from the remote station, respectively.

The term "message" should be interpreted broadly. If the autonomous vehicle is configured to receive the message from the one or more vehicles causing it to slow down, it may e.g. refer to wireless communication attempts, as well as to an application of an emergency siren, and also to combinations of messages over different channels. If the autonomous vehicle is configured to receive the message, e.g. via a means for wireless communication, from the remote station, this may e.g. be an authority like a police station, or a station belonging to an owner of the autonomous vehicle. In all cases, the described inhibition is adapted to facilitate the assessment of the driving situation as being due to an authorized emergency, rather than a potential plunder incident.

Optionally, the assessment module is configured to assess a potential plunder incident based on the driving situation to correspond, for at least a specified duration, to the following: The autonomous vehicle comes to standstill, and objects in a vicinity of the autonomous vehicle prevent it from moving.

Optionally, if the autonomous vehicle comprises one or more lights, a horn, and at least one means for wireless communication with a remote station, the reaction module is configured to execute, as emergency reaction, one or more of the following:
 sending an emergency signal to the remote station via at least one means for wireless communication,
 sending a heartbeat-type signal comprising a position and a status of the autonomous vehicle to the remote station via at least one means for wireless communication,
 activating the one or more lights and the horn in a continuous way.

Optionally, if the autonomous vehicle comprises at least one means for wireless communication with a remote station, and a video camera, the reaction module is configured to activate, as emergency reaction, the video camera, and to send data of the video camera to the remote station via at least one means for wireless communication. The video camera may e.g. be a dashcam, which is automatically activated if the system suspects a plunder incident to be imminent.

Optionally, a warning sign informing about a presence of the security system is displayed on the autonomous vehicle. This may serve as a prevention of a deliberate blockage and/or plunder by notifying illegal actors of the presence of the security system, thus making a plundering of the autonomous vehicle less attractive.

Embodiments further refer to an autonomous vehicle comprising a sensor unit for collecting sensor information, and a planning unit for generating planning data, and characterized by a security system as described above.

Furthermore, the present invention refers to a method for an autonomous vehicle driving on a road, wherein the autonomous vehicle comprises a sensor unit for collecting sensor information, and planning unit for generating planning data for the autonomous vehicle, the method comprising the steps:
- receiving the sensor information and the planning data;
- detecting, based on the sensor information, a driving situation of the autonomous vehicle in which one or more objects on the road force the vehicle to slow down without this being expected from the trajectory;
- assessing the driving situation based on the detection of the driving situation, the sensor information, and the planning data, as a potential plunder incident; and
- executing, in case of the potential plunder incident, an emergency reaction of the autonomous vehicle.

This method may also be implemented in software or a computer program product and the order of steps may not be important to achieve the desired effect. Embodiments of the present invention can, in particular, be implemented by software or a software module in an electronic control unit. Therefore, embodiment relate also to a computer program having a program code for performing the method, when the computer program is executed on a processor.

Some examples of the systems and/or methods will be described in the following by way of examples only, and with respect to the accompanying figures.

DETAILED DESCRIPTION OF THE DRAWINGS

Figure 1:
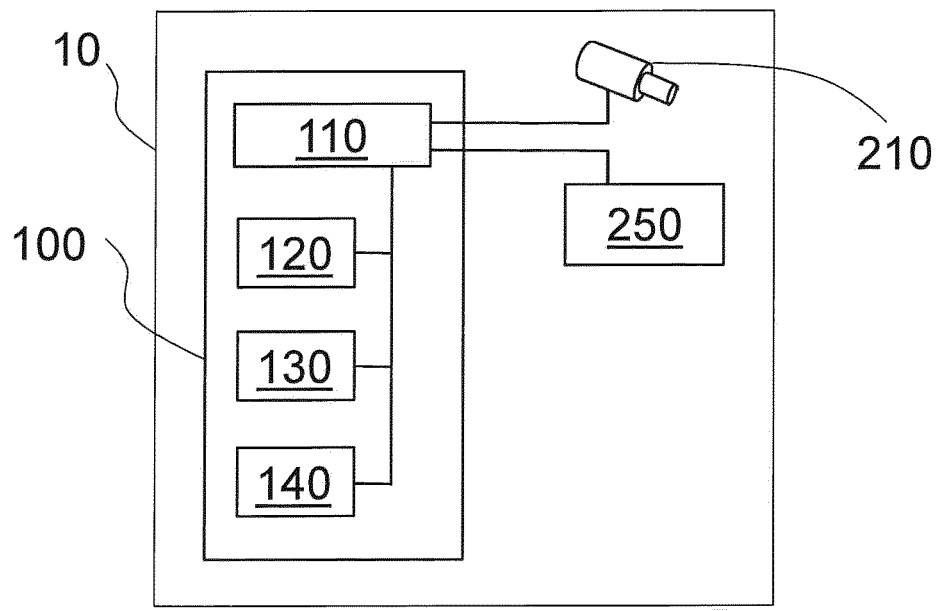
FIG. 1 depicts a schema of an embodiment of the proposed security system for an autonomous vehicle.

FIG. 1 depicts a schema of an embodiment of the proposed security system 100 for an autonomous vehicle 10. The system 100 comprises a reception module 110, a detection module 120, an assessment module 130, and a reaction module 140. The reception module 110 communicates with other components of the autonomous vehicle 10. In particular, the reception module 110 receives sensor information from a sensor unit 210 and planning data of a planning unit 250 of the autonomous vehicle 10. The detection module 120 is configured to detect, based on the sensor information, a driving situation of the autonomous vehicle 10 in which one or more objects on the road cause the autonomous vehicle 10 to slow down or stop. The assessment module 130 is configured to then assess the driving situation, employing the sensor information and the planning data for this task, and to decide if the situation points at a potential plunder incident. If this is the case, the reaction module 140 is configured to execute an emergency reaction of the autonomous vehicle 10.

Figure 4:
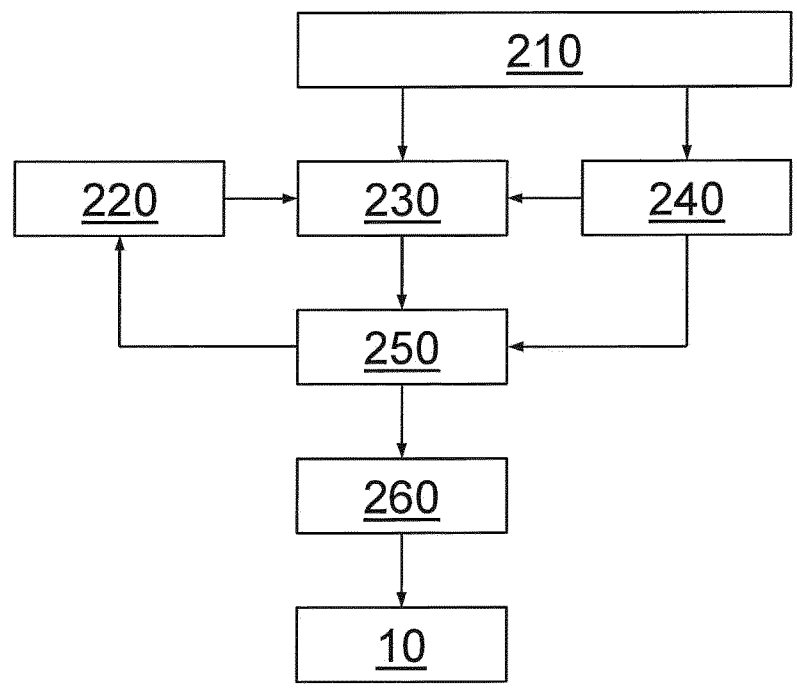
FIG. 4 shows a schema for an autonomous driving.

Advantageously, the security system 100 is realized in close conjunction with an existing automated driving system of the autonomous vehicle 10, whose generic components are illustrated in FIG. 4. In the assessment of the assessment module 130, a potential plunder incident may, for example, be assumed in case of a deliberate blockage situation, which can be determined by continuously evaluating expected and detected behavior of other road objects. The reaction module 140 may be, for example, configured to start broadcasting an emergency signal and/or a video stream to logistics infrastructure and/or to the police immediately after a deliberate blockage situation is recognized.

Figure 2:
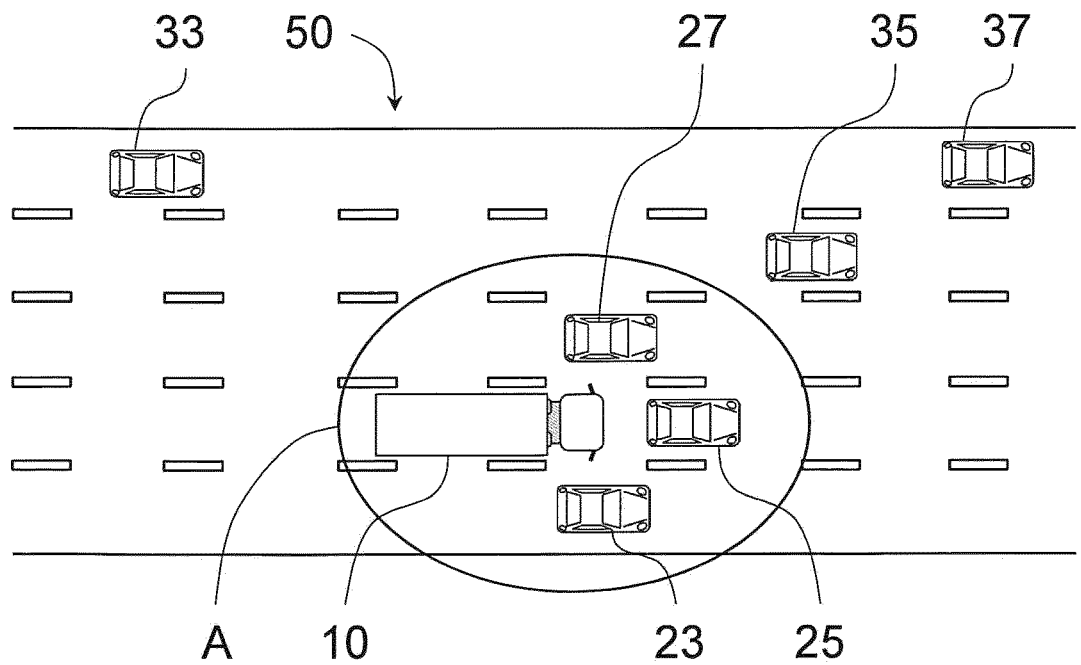
FIG. 2 depicts a generic situation of a blockage of a commercial autonomous vehicle by three vehicles.

FIG. 2 illustrates, as an example for a potential plunder incident, a generic situation of a blockage A of a commercial autonomous vehicle 10 by three other vehicles 23, 25, 27 on a road 50. The other vehicles 23, 25, 27 are in positions right in front and besides the commercial autonomous vehicle 10, and are slowing down to low speed, or stop, leaving no way for the commercial autonomous vehicle 10 to overtake. Meanwhile, further vehicles 33, 35, 37 in the proximity of the commercial autonomous vehicle 10 have free way to go. The security system 100 (not depicted here) of the commercial autonomous vehicle 10 may determine this, and likewise that there is no blocking traffic and/or no stop traffic control (like traffic signs or a barrier) in front of the other vehicles 23, 25, 27 either. The other vehicles 23, 25, 27 may not be transmitting neither standard nor proprietary secure communication over any wireless connection (as e.g. a V2V connection) of the commercial autonomous vehicle 10, which could be used for police, ambulance or other authorities to provide the option of establishing an authorization for stopping the commercial autonomous vehicle 10. Furthermore, the situation may persist for at least a specified time frame, like e.g. 10 seconds. On these grounds, the detection module 120 (not depicted) may be configured to detect that this is driving situation where the other vehicles 32, 35, 37 cause the commercial autonomous vehicle 10 to slow down, and assessment module 130 (not depicted) may be configured to assess this driving situation, and verify that it corresponds to a potential plunder incident.

Figure 3:
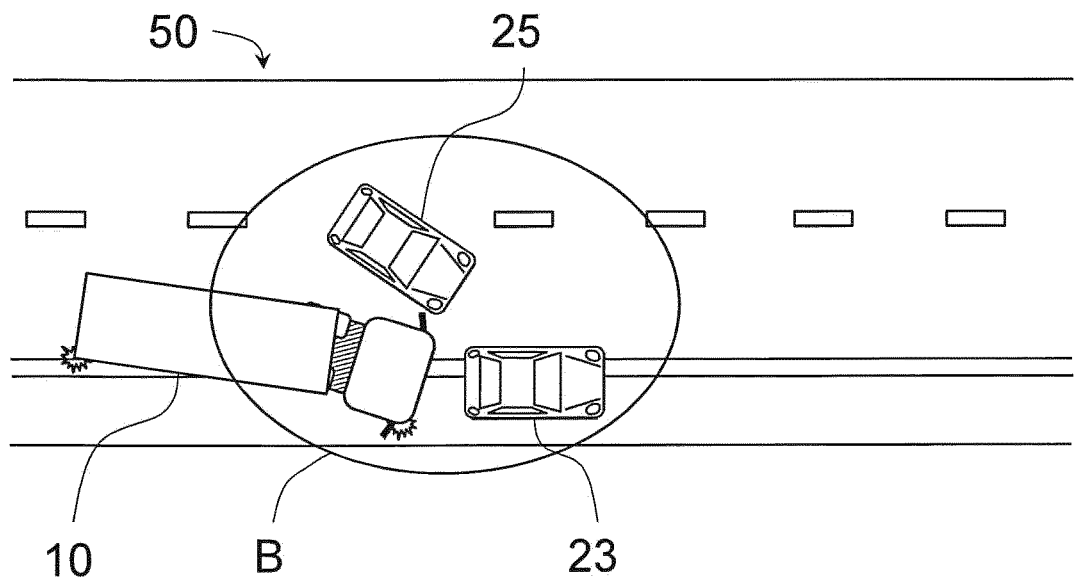
FIG. 3 depicts a generic situation for two vehicles forcing a commercial autonomous vehicle off a road.

FIG. 3 illustrates, as an example for a potential plunder incident, a further generic blockage situation B, in which a commercial autonomous vehicle 10 is forced by two other vehicles 23, 25 off a driving lane of a road 50. The other vehicles 23, 25 right in front and besides the commercial autonomous vehicle 10 are forcing the commercial autonomous vehicle 10 to go off its lane or even off the road by approaching it so closely that a collision avoidance system of the commercial autonomous vehicle 10 is activated, while further vehicles in the proximity of the commercial autonomous vehicle 10 would have free way to go. If the other vehicles 23, 25 do not transmit a message establishing their authorization, and the situation persists for some predefined amount of time, the assessment module 140 of the security system 100 (not depicted) on the commercial autonomous vehicle 10 will assess the situation to be a potential plunder incident. Alternatively, a potential plunder incident may also be established if the depicted situation B dissolves, but some other objects (e.g. any type of blockage, pedestrians, etc.) remain in the proximity of the commercial autonomous vehicle 10, forcing it to remain in standstill.

FIG. 4 shows a schema for a generic autonomous driving system of the vehicle 10, which can be used to implement the embodiment of the security system 100. The autonomous driving system comprises an environment perception unit 230, a behavior planner or planning unit 250, a motion controller 260, a surveillance system 240, and a means for wireless communications 220, e.g. for communication with a logistics infrastructure. Means for wireless communication may be e.g. Mobile 3G, 4G, 5G, DSCR, satellite, or any other means enabling data communication over a wireless connection. Advantageously, the environment perception module is configured to detect the following parameters using perception and other sensors 210 (as e.g. cameras, radars, lidars, and/or ultrasonic sensors): a drivable surface, road lanes, road objects (as e.g. vehicles, pedestrians, guide rails, bridges, tunnels, construction site objects, etc.), and non-road objects (as e.g. trees, houses, animals, walls, poles, etc.). The planning unit 250 is adapted to determine and continuously re-evaluate (among other parameters) the following environmental conditions: relative positions of road and non-road objects within a comprehensive environment map, and a predicted behavior of all detected road vehicles and/or pedestrians around the autonomous vehicle 10 according to an overall detected traffic scenario and density. The task of embodiments of the proposed system 100 (not depicted) to perform an evaluation of movements of road objects in a driving situation under a given scenario may be advantageously effectuated using the described capabilities of the planning unit 250. Also, communication of the security system 100 with other vehicles or with a remote station may be implemented by means of the means for wireless communication 220.

Figure 5:
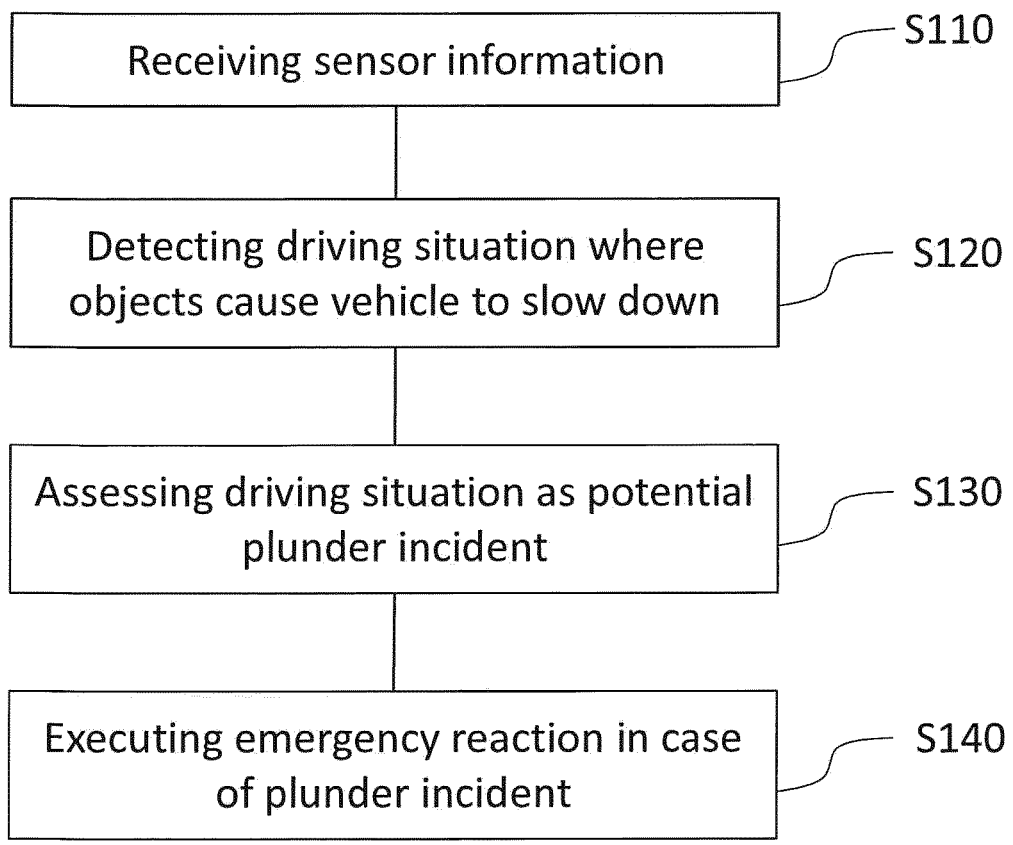
FIG. 5 shows steps of an exemplary method for an autonomous vehicle according to the present invention.

FIG. 5 depicts steps of an exemplary method for operating a security system 100 for an autonomous vehicle 10 according to the present invention. The autonomous vehicle 10 drives on a road 50, and comprises a sensor unit 210 for collecting sensor information, and a planning unit 250 for generating planning data for the autonomous vehicle 10. A first step comprises receiving S110 the sensor information and the planning data. A further step comprises detecting S120, based on the sensor information, a driving situation of the autonomous vehicle 10 in which one or more objects on the road 50 cause the vehicle 10 to slow down, e.g. without this being expected from a higher layer in the planning data. A further step comprises assessing S130 the driving situation based on the detection of the driving situation, the sensor information, and the planning data, as a potential plunder incident. A further step comprises executing S140, in case of the potential plunder incident, an emergency reaction of the autonomous vehicle 10.

This method may also be a computer-implemented method. A person of skill in the art will readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein, unless it is stated that a specific combination is not intended.

LIST OF REFERENCE SIGNS

A,B blockage situations
10 autonomous vehicle
23, 25, 27 other vehicles, involved in a blocking of the autonomous vehicle
33, 35, 37 further vehicles
50 road
100 safety system
110 reception module
120 detection module
130 assessment module
140 reaction module
210 sensor unit
220 means for wireless communication
230 environment perception unit
240 surveillance unit
250 planning unit
260 motion controller
S110, . . . S140 steps of a method

The invention claimed is:

1. A security system for an autonomous vehicle driving on a road, wherein the autonomous vehicle comprises a sensor unit for collecting sensor information, a planning unit for generating planning data for the autonomous vehicle, one or more lights, and a horn, the security system comprising:
   a reception module configured to receive the sensor information and the planning data;
   a detection module configured to detect, based on the sensor information, a driving situation of the autonomous vehicle in which one or more objects on the road cause the autonomous vehicle to slow down;
   an assessment module configured to assess the driving situation based on the detection of the driving situation, the sensor information, and the planning data, as a potential plunder incident; and
   a reaction module configured to execute, in case of the potential plunder incident, an emergency reaction of the autonomous vehicle, wherein the emergency reaction comprises activating the one or more lights and the horn in a continuous way.

2. The security system according to claim 1, wherein the detection module and/or the assessment module and/or the reaction module are configured to extract, from the sensor information, information about one or more of the following:
   road vehicles and pedestrians around the autonomous vehicle,
   road markings,
   objects on the road, or
   objects away from the road.

3. The security system according to claim 2, wherein the planning unit is configured to generate a traffic behavior prediction for vehicles and/or pedestrians around the autonomous vehicle; and
the assessment module is configured to:
   receive the traffic behavior prediction,
   perform, based on a comparison between the traffic behavior prediction and the information about road vehicles and/or pedestrians, an evaluation of a behavior of the road vehicles and/or pedestrians, and
   use the evaluation for assessing the driving situation.

4. The security system according to claim 1, wherein
the assessment module is configured to assess a potential plunder incident based on the driving situation corresponding to, for at least a specified duration, the following:
one or more vehicles positioned next to the autonomous vehicle that slow down and do not allow for a direction for the autonomous vehicle to overtake the one or more vehicles, and there is no object on the road and no object away from the road which requires the one or more vehicles to slow down.

5. The security system according to claim 1, wherein the autonomous vehicle comprises a Collision Avoidance System, and
the reception module is configured to receive information from the Collision Avoidance System, and
the assessment module is configured to assess a potential plunder incident based on the driving situation corresponding to, for at least a specified duration, the following:
one or more vehicles positioned next to the autonomous vehicle that do not allow for a direction for the autonomous vehicle to overtake the one or more vehicles, and the Collision Avoidance System directs the car off a lane and/or off the road in order to avoid collision with the one or more vehicles.

6. The security system according to claim 5, wherein
the autonomous vehicle is configured to receive, from the one or more vehicles and/or from a remote station, a message establishing an authorization, and
the assessment module is configured to suppress the assessment of a potential plunder incident if the autonomous vehicle receives the message establishing the authorization from the one or more vehicles and/or from the remote station.

7. The security system according to claim 4, wherein
the autonomous vehicle is configured to receive, from the one or more vehicles and/or from a remote station, a message establishing an authorization, and
the assessment module is configured to suppress the assessment of a potential plunder incident if the autonomous vehicle receives the message establishing the authorization from the one or more vehicles and/or from the remote station.

8. The security system according to claim 4, wherein
the assessment module is configured to assess a potential plunder incident based on the driving situation corresponding to, for at least a specified duration, the following:
the autonomous vehicle comes to standstill, and objects in a vicinity of the autonomous vehicle prevent the vehicle from moving.

9. The security system according to claim 5, wherein
the assessment module is configured to assess a potential plunder incident based on the driving situation corresponding to, for at least a specified duration, the following:
the autonomous vehicle comes to standstill, and objects in a vicinity of the autonomous vehicle prevent the vehicle from moving.

10. The security system according to claim 1, wherein
the autonomous vehicle comprises at least one means for wireless communication with a remote station,
the reaction module is configured to execute, as the emergency reaction, one or more of the following:
sending an emergency signal to the remote station via the at least one means for wireless communication,
sending a heartbeat-type signal comprising a position and a status of the autonomous vehicle to the remote station via the at least one means for wireless communication.

11. The security system according to claim 1, wherein
the autonomous vehicle comprises at least one means for wireless communication with a remote station, and a video camera,
the reaction module is configured to activate, as an emergency reaction, the video camera, and to send data of the video camera to the remote station via the at least one means for wireless communication.

12. The security system according to claim 1, further comprising:
a display for displaying a warning sign informing about a presence of the security system.

13. The security system according to claim 1, wherein the autonomous vehicle further comprises:
the security system.

14. A method for operating a security system for an autonomous vehicle driving on a road, wherein the autonomous vehicle comprises a sensor unit for collecting sensor information, a planning unit for generating planning data for the autonomous vehicle, one or more lights, and a horn, the method comprising:
receiving the sensor information and the planning data;
detecting, based on the sensor information; a driving situation of the autonomous vehicle in which one or more objects on the road cause the autonomous vehicle to slow down;
assessing the driving situation based on the detection of the driving situation, the sensor information, and the planning data, as a potential plunder incident; and
executing, in case of the potential plunder incident, an emergency reaction of the autonomous vehicle, wherein the emergency reaction comprises activating the one or more lights and the horn in a continuous way.

15. The method according to claim 14, further comprising:
generating, via the planning unit, a traffic behavior prediction for vehicles and/or pedestrians around the autonomous vehicle; and
receiving, via an assessment module, the traffic behavior prediction,
performing, based on a comparison between the traffic behavior prediction and the information about road vehicles and/or pedestrians, an evaluation of a behavior of the road vehicles and/or pedestrians, and
using the evaluation for assessing the driving situation.

16. The method according to claim 14, further comprising:
assessing a potential plunder incident based on the driving situation corresponding to, for at least a specified duration, the following:
one or more vehicles positioned next to the autonomous vehicle that slow down and do not admit a direction for the autonomous vehicle to overtake the one or more vehicles, and there is no object on the road and no object away from the road which requires the one or more vehicles to slow down.

17. The method according to claim 14, further comprising:
receiving information from a Collision Avoidance System, and
assessing a potential plunder incident based on the driving situation corresponding to, for at least a specified duration, the following:

one or more vehicles positioned next to the autonomous vehicle that do not admit a direction for the autonomous vehicle to overtake the one or more vehicles, and the Collision Avoidance System directs the car off a lane and/or off the road in order to avoid collision with the one or more vehicles.

18. The method according to claim 17, further comprising:
receiving, from the one or more vehicles and/or from a remote station, a message establishing an authorization, and
suppressing the assessment of a potential plunder incident if the autonomous vehicle receives the message establishing the authorization from the one or more vehicles and/or from the remote station.

19. The method according to claim 16, further comprising:
receiving, from the one or more vehicles and/or from a remote station, a message establishing an authorization, and
suppressing the assessment of a potential plunder incident if the autonomous vehicle receives the message establishing the authorization from the one or more vehicles and/or from the remote station.

20. A computer product comprising a non-transitory computer readable medium having stored thereon program code which, when the program code is executed on a computer or data processing unit, causes the acts of:
receiving the sensor information and the planning data;
detecting, based on the sensor information; a driving situation of the autonomous vehicle in which one or more objects on the road cause the autonomous vehicle to slow down;
assessing the driving situation based on the detection of the driving situation, the sensor information, and the planning data, as a potential plunder incident; and
executing, in case of the potential plunder incident, an emergency reaction of the autonomous vehicle, wherein the emergency reaction comprises activating one or more lights and a horn of an autonomous vehicle in a continuous way.

* * * * *